US009014067B2

(12) United States Patent
Chun et al.

(10) Patent No.: US 9,014,067 B2
(45) Date of Patent: Apr. 21, 2015

(54) METHOD AND APPARATUS FOR CONFIGURING FRAME IN WIRELESS COMMUNICATION SYSTEM INCLUDING RELAY STATION

(75) Inventors: Jin Young Chun, Anyang-si (KR); Jin Sam Kwak, Anyang-si (KR); Jin Soo Choi, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 13/642,092

(22) PCT Filed: Apr. 21, 2011

(86) PCT No.: PCT/KR2011/002855
§ 371 (c)(1),
(2), (4) Date: Oct. 18, 2012

(87) PCT Pub. No.: WO2011/132947
PCT Pub. Date: Oct. 27, 2011

(65) Prior Publication Data
US 2013/0034030 A1 Feb. 7, 2013

Related U.S. Application Data

(60) Provisional application No. 61/326,233, filed on Apr. 21, 2010.

(30) Foreign Application Priority Data

Mar. 24, 2011 (KR) .................. 10-2011-0026464

(51) Int. Cl.
*H04J 1/00* (2006.01)
*H04B 7/208* (2006.01)
(Continued)

(52) U.S. Cl.
CPC .......... *H04B 7/15542* (2013.01); *H04L 1/1854* (2013.01); *H04L 1/1861* (2013.01);
(Continued)

(58) Field of Classification Search
USPC ......... 370/276, 277, 279, 281, 293, 295, 315, 370/328, 329, 330, 343, 344, 480
See application file for complete search history.

(56) References Cited

U.S. PATENT DOCUMENTS 8,542,628 B2 * 9/2013 Chang et al. .................. 370/324
2008/0159217 A1 * 7/2008 Chang et al. .................. 370/329
(Continued)

FOREIGN PATENT DOCUMENTS

| JP | 2012513155 | 6/2012 |
|----|------------|--------|
| JP | 2013502871 | 1/2013 |

(Continued)

OTHER PUBLICATIONS

Shkumbin Hamiti, "The Draft IEEE 802.16m System Description Document", IEEE 802.16 Broadband Wireless Access Working Group, IEEE 802.16m-08/003r3, Jun. 16, 2008.

(Continued)

*Primary Examiner* — Hoon J Chung
*Assistant Examiner* — Feben M Haile
(74) *Attorney, Agent, or Firm* — McKenna Long & Aldridge LLP

(57) ABSTRACT

A method and apparatus of communicating by a relay station a wireless communication system including a relay station is provided. The method include communicating with at least one of a base station and a user equipment through a frequency division duplex (FDD) uplink (UL) frame configured by the base station, the FDD UL frame including a UL relay zone including a plurality of UL subframes and a UL access zone including a plurality of UL subframes. The UL relay zone is a sector used for the relay station to transmit a signal to the base station, and the UL access zone is a sector used for the relay station to receive a signal from the user equipment. The UL relay zone is located before the UL access zone within the FDD UL frame.

10 Claims, 13 Drawing Sheets

(51) Int. Cl.
*H04B 7/155* (2006.01)
*H04L 1/18* (2006.01)
*H04W 72/04* (2009.01)
*H04W 84/04* (2009.01)
*H04L 1/00* (2006.01)
*H04L 5/00* (2006.01)
*H04L 5/14* (2006.01)

(52) U.S. Cl.
CPC ............ *H04L1/1887* (2013.01); *H04L 1/1893* (2013.01); *H04W 72/04* (2013.01); *H04W 84/047* (2013.01); *H04L 2001/0097* (2013.01); *H04L 5/0094* (2013.01); *H04L 5/143* (2013.01); *H04L 5/0055* (2013.01)

(56) References Cited

U.S. PATENT DOCUMENTS

| | | | |
|---|---|---|---|
| 2008/0165881 A1 | 7/2008 | Tao et al. | |
| 2010/0157826 A1* | 6/2010 | Yu et al. | 370/252 |
| 2010/0211845 A1* | 8/2010 | Lee et al. | 714/749 |
| 2010/0278123 A1* | 11/2010 | Fong et al. | 370/329 |

FOREIGN PATENT DOCUMENTS

| | | |
|---|---|---|
| WO | 2010029631 | 3/2010 |
| WO | 2011025206 | 3/2011 |

OTHER PUBLICATIONS

LaJolla, "Overview of IEEE P802.16m Technology and Candidate RIT for IMT-Advanced", IEEE 802.16 IMT-Advanced Evaluation Group Coordination Meeting, Jan. 13, 2010.

Sydir et al., "An Evolved Cellular System Architecture Incorporating Relay Stations", IEEE Communications Magazine, Jun. 2009 (pp. 118-120).

IEEE Std 802.16j, "Part 16: Interface for Broadband Wireless Access Systems, Amendment 1: Multihop Relay Specification", IEEE Standard of Local and Metropolitan Area Networks, Jun. 12, 2009.

Xiangying Yang, Datapath operation for 16m relays (16.6), IEEE C802.16 m-09/3038, Dec. 31, 2009, URL, http://grouper.ieee.rg/groups/802/16/tgm/contrib/C80216m-09_3038.doc.

Gamini Senarath, Clarification on FDD and H-FDD frame structure for IEEE 802.16j Multihop Relay Networks, IEEE C802.16j-08/150r1, Sep. 17, 2008, URL, http://grouper.ieee.org/groups/802/16/relay/contrib/C80216j-08_150r1.doc.

Alexander Maltsev, Cleanup on HARQ Signaling and Timing for Relay Support (16.6.2.9.1), IEEE C80216m-10/0095r1, Mar. 16, 2009, URL, http://grouper.ieee.org/groups/802/16/tgm/contrib/C80216m-10_0095r1.doc.

Jinyoung Chun, A-MAP relevance and HARQ timing in relay frame structure (16.6.3), IEEE C802.16m-09/2874, Dec. 30, 2009, URL http: //grouper.ieee.org/groups/802/16/tgm/contrib/C80216m-09_2874.doc.

\* cited by examiner

METHOD AND APPARATUS FOR CONFIGURING FRAME IN WIRELESS COMMUNICATION SYSTEM INCLUDING RELAY STATION

This Application is a 35 U.S.C. §371 National Stage Entry of International Application No. PCT/KR2011/002855, filed Apr. 21, 2011 and claims the benefit of U.S. Provisional Application No. 61/326,233, filed Apr. 21, 2010, and Korean Application No: 10-2011-0026464, filed Mar. 24, 2011, all of which are incorporated by reference in their entirety herein.

TECHNICAL FIELD

The present invention relates to a wireless communication system, and more particularly, to a method and apparatus for configuring a frame in a wireless communication system including a relay station.

BACKGROUND ART

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Recently, a wireless communication system including a relay station (RS) has been developed. The relay station serves to expand cell coverage and improve transmission performance. The cell coverage may be expanded as a base station provides service to a mobile station located at the coverage boundary of the base station by using a relay station. Furthermore, since the relay station enhances the reliability of signal transmission between the base station and the mobile station, transmission capacity can be increased. Even when a mobile station is within the coverage of the base station, the relay station may be used in the case where the mobile station is located in a shadow zone.

A frame structure of a system adopting such a relay station may be different from a frame structure of a system without the relay station. A portion of the frame may be used just for communication between a base station and a mobile station or between a relay station and a mobile station, while another portion of the frame is used for communication between the base station and the relay station. A region in which the mobile station can transmit/receive data to/from the base station or the relay station is limited, and thus Hybrid Automatic Repeat request (HARQ) feedback or the like is also limited.

In the system adopting the relay station, there is need for a new frame structure for efficiently performing HARQ feedback.

SUMMARY OF INVENTION

Technical Problem

An aspect of the present invention provides a method and apparatus for forming a frame in a wireless communication system including a relay station. In more detail, there is provided a method of configuring a relay zone and an access zone within a frame in a Frequency Division Duplex (FDD) system.

Solution to Problem

In an aspect, a method of communicating by a relay station a wireless communication system including a relay station is provided. The method include communicating with at least one of a base station and a user equipment through a frequency division duplex (FDD) uplink (UL) frame configured by the base station, the FDD UL frame including a UL relay zone including a plurality of UL subframes and a UL access zone including a plurality of UL subframes, wherein the UL relay zone is a sector used for the relay station to transmit a signal to the base station, the UL access zone is a sector used for the relay station to receive a signal from the user equipment, and the UL relay zone is located before the UL access zone within the FDD UL frame.

The plurality of UL subframes included in the UL access zone may be four in number if the number of subframes included in the FDD UL frame is eight.

The method may further include communicating with at least one of the base station and the user equipment through a FDD downlink (DL) frame configured by the base station, the FDD DL frame including a DL relay zone including a plurality of DL subframes and a DL access zone including a plurality of DL subframes, wherein the DL access zone is located before the DL relay zone within the FDD DL frame.

The plurality of DL subframes included in the DL access zone may be four in number if when the number of subframes included in the FDD DL frame is eight.

A Relay Receive to transmit Transition Interval (R-RTI), which is a transition gap for which a reception mode of the relay station changes to a transmission mode, may be inserted in the UL relay zone.

The R-RTI may be inserted in position of a first Orthogonal Frequency Division Multiple Access (OFDMA) symbol of the plurality of UL subframes included in the UL relay zone.

A Relay Transmit to receive Transition Interval (R-TTI), which is a transition gap for which a transmission mode of the relay station changes to a reception mode, may be inserted in the UL relay zone.

The R-TTI may be inserted in position of a last OFDMA symbol of a last UL subframe of the plurality of UL subframes included in the UL relay zone.

In another aspect, a method of performing a Hybrid Automatic Repeat request (HARM) by a mobile station in a wireless communication system including a relay station is provided. The method include receiving an Uplink (UL) assignment A-MAP Information Element (IE) from the relay station through a downlink (DL) access zone within a first frame, transmitting a UL data burst, corresponding to the UL assignment A-MAP IE, through an UL access zone within the first frame, and receiving an Acknowledgement (ACK)/Non-acknowledgement (NACK) signal with respect to the data burst, through a DL access zone within a second frame contiguous to the first frame, wherein the first frame and the second frame are Frequency Division Duplex (FDD) frames each divided into a DL frame and a UL frame in a frequency region, the UL frame comprises a UL relay zone including a plurality of UL subframes, and a UL access zone including a plurality of UL subframes, and the UL relay zone is located before the UL access zone in the UL frame.

The plurality of UL subframes included in the UL access zone may be four in number if the number of subframes included in the FDD UL frame is eight.

The DL frame may comprise a DL relay zone including a plurality of DL subframes, and a DL access zone including a plurality of DL subframes, and the DL access zone may be located before the DL relay zone in the DL frame.

The plurality of DL subframes included in the DL access zone may be four in number if the number of subframes included in the FDD DL frame is eight.

A Relay Receive to transmit Transition Interval (R-RTI), which is a transition gap for which a reception mode of the relay station changes to a transmission mode, may be inserted in the UL relay zone.

A Relay Transmit to receive Transition Interval (R-TTI), which is a transition gap for which a transmission mode of the relay station changes to a reception mode, may be inserted in the UL relay zone.

In another aspect, a user equipment in a wireless communication system including a relay system is provided. The user equipment includes a radio frequency (RF) unit for transmitting or receiving a radio signal, and a processor, coupled to the RF unit, and configure to receive an Uplink (UL) assignment A-MAP Information Element (IE) from the relay station through a Downlink (DL) access zone within a first frame, transmit a UL data burst, corresponding to the UL assignment A-MAP IE, through a UL access zone within the first frame, and receive an Acknowledgement (ACK)/Non-acknowledgement (NACK) signal with respect to the UL data burst from the relay station through a DL access zone within a second frame contiguous to the first frame, wherein the first frame and the second frame are Frequency Division Duplex (FDD) frames each divided into a DL frame and a UL frame in a frequency region, the UL frame comprises a UL relay zone including a plurality of UL subframes, and a UL access zone including a plurality of UL subframes, and the UL relay zone is located before the UL access zone in the UL frame.

Advantageous Effects of Invention

A Frequency Division Duplex (FDD) system including a relay station may utilize the Hybrid Automatic Repeat request (HARQ) timing of an existing system without a relay station.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Figure 1:
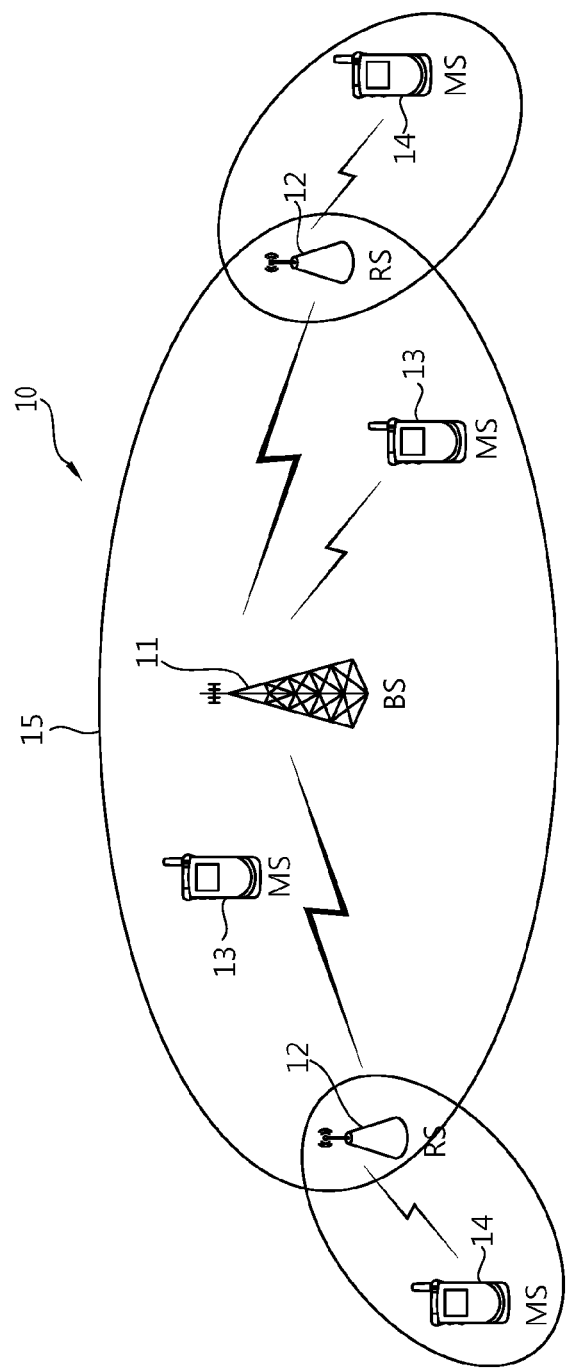
FIG. 1 illustrates a wireless communication system including a relay station.

FIG. 1 illustrates a wireless communication system including a relay station.

Referring to FIG. 1, a wireless communication system 10 including a relay station includes at least one base station (BS) 11. Each base station 11 provides communication service over a specific geographical zone 15 called a cell. The cell may be divided into a plurality of regions, and each of the regions is referred to as a sector. A single base station may have one or more cells. In general, the base station 11 means a fixed station communicating with a mobile station 13, and may be referred to as other terms such as an evolved NodeB (eNB), a Base Transceiver System (BTS), an access point, an Access Network (AN), an advanced BS (ABS), or the like. The base station 11 may perform functions such as connectivity, management, control, and resource assignment between a relay station 12 and a mobile station 14.

The relay station (RS) 12 means a device that relays (repeats) a signal between the base station 11 and the mobile station 14, and may be referred to as other terms such as a Relay Node (RN), a repeater, an advanced RS (ARS) and the and the like. As a relay scheme used by the relay station, any method such as Amplify and Forward (AF), Decode and Forward (DF) and the like may be used, and the technical aspect of the present invention is not limited thereto.

The mobile stations (MS) 13 and 14 may be fixed or have mobility, and may be referred to as other terms such as an advance Mobile Station (AMS), a User Terminal (UT), a Subscriber Station (SS), a wireless device, a Personal Digital Assistant (PDA), a wireless modem, a handheld device, user equipment, and the like. Hereinafter, a macro mobile station is a mobile station that directly communicates with a base station, and a relay mobile station denotes a mobile station that communications with a relay station. The macro mobile station 13, even when being within a cell of the base station 11, may communicate with the base station 11 via the relay station 12 in order to enhance transmission speed according to diversity effects.

A mobile station normally belongs to a single cell, and this cell to which the mobile station belongs is called a serving cell. A base station providing communication service over the serving cell is called a serving BS. Since a wireless communication system is a cellular system, another cell adjacent to the serving cell is present, and this is referred to as a neighbor cell. A base station providing communication service over the neighbor cell is referred to as a neighbor BS. The serving cell and the neighbor cell are determined relatively with respect to the mobile station.

This technique may be used in a downlink (DL) and an uplink (UL). Between a base station and a mobile station, the downlink means communication from the base station to a macro mobile station, and the uplink means communication from the macro mobile station to the base station. Between a base station and a relay station, the downlink means communication from the base station to the relay station, and the uplink means communication from the relay station to the base station. Between a relay station and a relay mobile station, the downlink means communication from the relay station to the relay mobile station, and the uplink means communication from the relay mobile station to the relay station. In the downlink, a transmitter may be part of the base station or the relay station, and a receiver may be part of the mobile station or the relay station. In the uplink, a transmitter may be part of the mobile station or the relay station, and a receiver may be part of the base station or the relay station.

Figure 2:
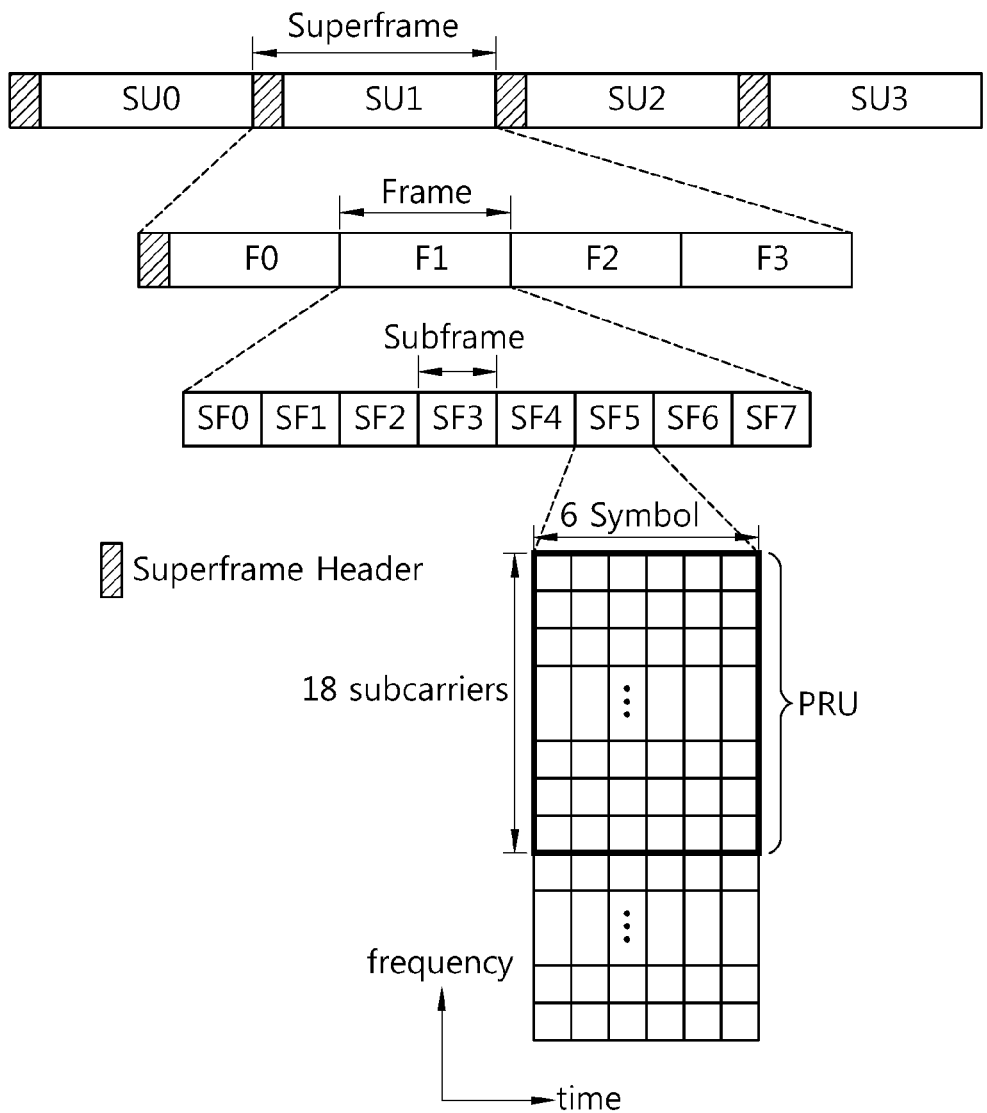
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) can carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH can be transmitted in every superframe. Information transmitted on the S-SFH can be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may be transmitted with period of 40 ms. The S-SFH SP2 includes information on initial network entry and network discovery. The S-SFH SP2 may be transmitted with period of 80 ms. The S-SFH SP3 includes other important system information. The S-SFH SP1 may be transmitted with period of either 160 ms or 320 ms.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/5 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, Tb(μs) | | | 91.4 | 128 | 102.4 | 91.4 | 91.4 |
| G = 1/8 | | Symbol time, Ts(μs) | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| G = 1/16 | | Symbol time, Ts(μs) | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | | Symbol time, Ts(μs) | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard sub-carriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000) 8000. A subcarrier spacing is defined as $\Delta f = Fs/N_{FFT}$. A useful symbol time is defined as $Tb=1/\Delta f$. A CP time is defined as $Tg=G \cdot Tb$. An OFDMA symbol time is defined as $Ts=Tb+Tg$. A sampling time is defined as $Tb/N_{FFT}$.

Hereinafter, the wireless communication system adopting a relay station will be described. A relay station may be introduced to an IEEE 802.16m system. A mobile station may be connected to a base station or the relay station, and receive service from the connected base station or relay station.

In an IEEE 802.16m system, relaying may be performed by a DF paradigm. In the downlink and the uplink, both Frequency Division Duplex (FDD and TDD) schemes may be supported. A relay station may operate in a Time-division-Transmit and Receive (TTR) mode or a simultaneous Transmit and Receive (STR) mode. In the TTR mode, access communication between the relay station and a mobile station and relay link communication between a base station and the relay station in a single Radio Frequency (RF) carrier wave are multiplexed by a Time Division Multiplexing (TDM) scheme. In the STR mode, if an access link and a relay link are sufficiently independent, the access link communication and the relay link communication can be synchronously carried out.

In an IEEE 802.16m system, a relay station operates in a non-transparent mode. In the non-transparent mode, relation stations form SFH and A-MAP for subordinate stations, and transmit A-preamble, SFH and A-MAP to the subordinate stations.

An IEEE 802.16m system adopting a relay station may utilize a distribution scheduling model in which each base station or relay station schedules radio resources for a subordinate link. In the case of the relay station, resource scheduling is performed within resources allocated from the base station. The base station may inform the relay station and a mobile station of the configuration of a frame structure. A radio frame may be divided into an access zone and a relay zone.

In the access zone, the base station and the relay station transmit signals to the mobile station or receive signals from the mobile station. In the relay zone, the base station transmits signals to the relay station (and the mobile station), or receives signals from the relay station (and the mobile station). The frame structure of the base station and the relay station may be aligned in time. The base station and the relay station may synchronously transmit A-preamble, SFH and A-MAP to the mobile station.

Figure 3:
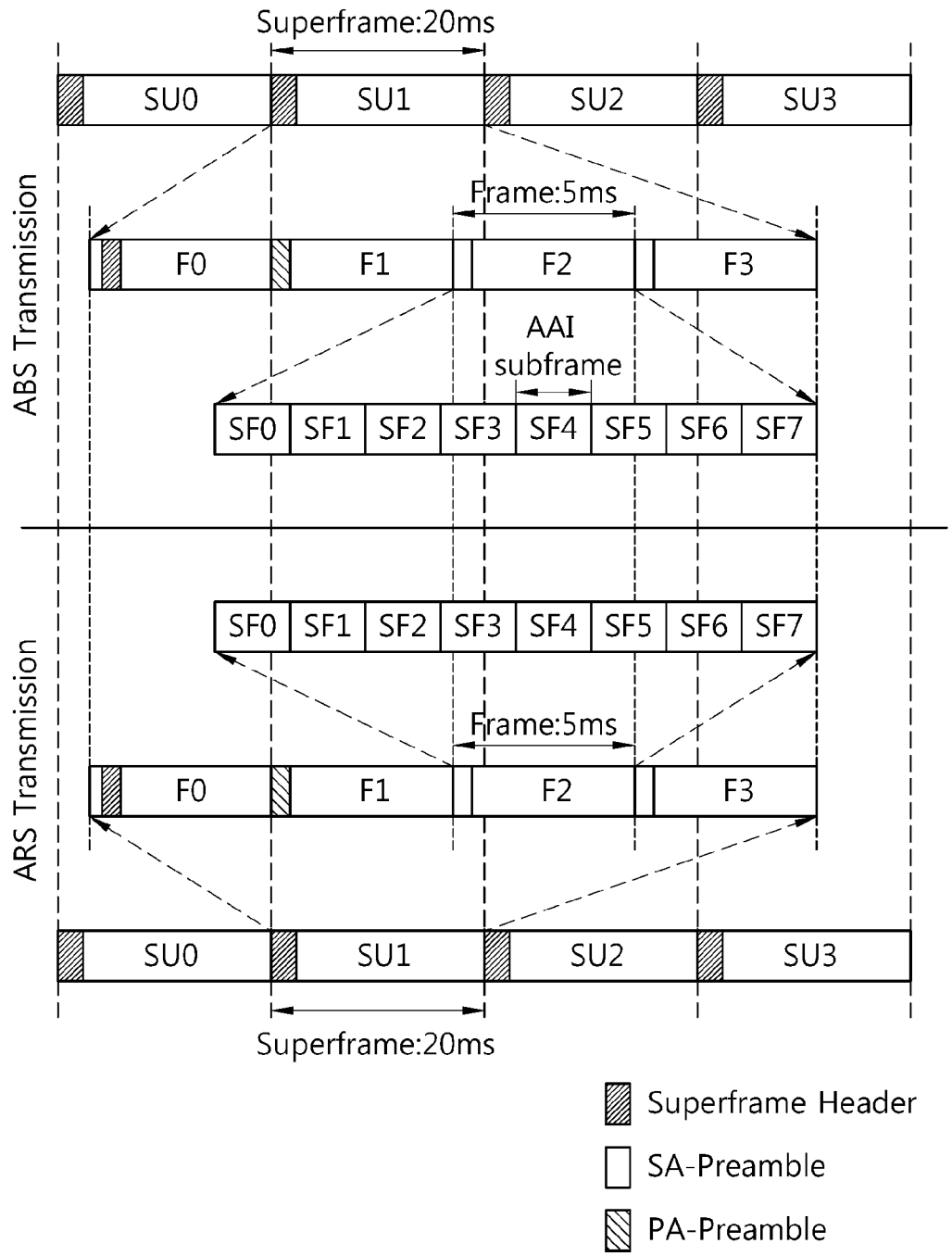
FIG. 3 illustrates one example of a base frame structure of a system supporting a relay station.

FIG. 3 illustrates one example of a base frame structure of a system supporting a relay station.

Like the base station, the system adopting a relay station may use OFDMA parameters of Table 1 as they are. Superframes of the base station and the mobile station are aligned in time, and may include the same number of frames and subframes. Each superframe of the relay station contains SFH, and the SFH transmitted by the relay station has the same position and format as SHF transmitted by the base station. A relay-station preamble (SA-preamble and A-preamble) is transmitted synchronously with a super-ordinate base-station preamble.

In the system supporting a relay station, a base-station frame may be divided into an access zone and a relay zone. In the frame, the access zone may be located before the relay zone. The duration of the access zone and the relay zone may be different in DL and UL. The configuration of the access zone and the relay zone may be made through a relay station configuration command message (AAI-ARS-config-CMD message) transmitted by the base station.

The access zone of the base-station frame includes a DL access zone and a UL access zone, and the relay zone includes a DL relay zone and a UL relay zone. The access zone of the base-station frame is used to communicate with only a mobile station. The relay zone of the base-station frame may be used to communicate with a relay station and with a mobile station. In the DL relay zone, the base station transmits a signal to a subordinate relay station, and in the UL relay zone, the base station receives signal from a subordinate relay station.

The access zone of the relay-station frame includes a DL access zone and a UL access zone, and the relay zone includes a DL relay zone and a UL relay zone. The access zone of the real-station frame is used to communicate with only a mobile station. In the DL relay zone, the relay station receives a signal from a superordinate base station, and, in the UL relay zone, the relay station transmits a signal to the superordinate base station.

A Relay Transmit to receive Transition Interval (R-TTI) may be inserted in each relay-station frame. The R-TTI may be inserted for Round-Trip Delay (RTD) and ARS Transmit/ receive Transition Gap (ARSTTG) between a relay station and a superordinate station. Furthermore, a Relay Receive to transmit Transition Interval (R-RTI) may be inserted in each relay-station frame. The R-RTI may be inserted for Round-Trip Delay (RTD) and ARS Receive/transmit Transition Gap (ARSRTG) between the relay station and the super-ordinate station.

Figure 4:
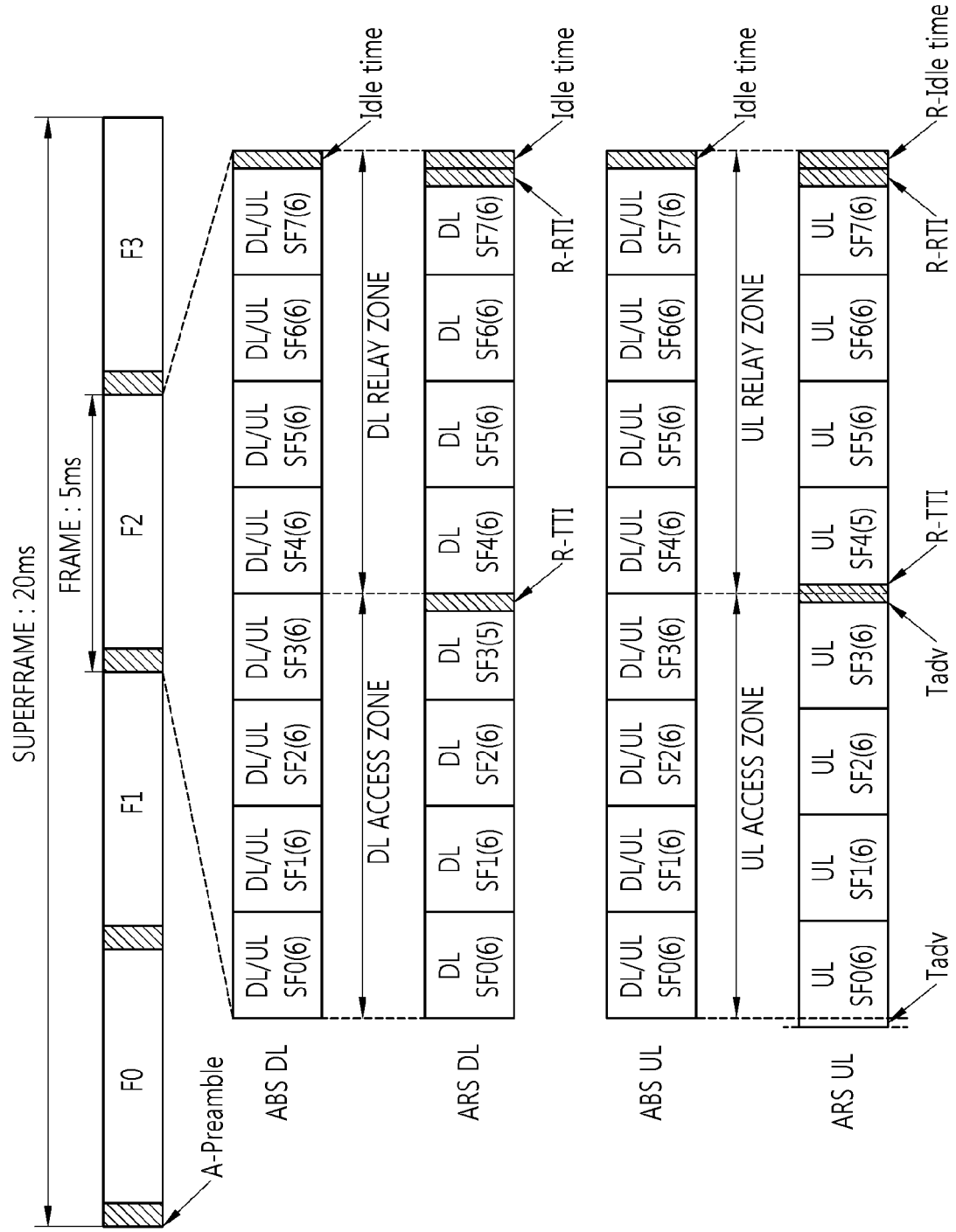
FIG. 4 illustrates one example of an FDD frame structure of a system supporting a relay station.

FIG. 4 illustrates one example of an FDD frame structure of a system supporting a relay station.

FIG. 4 illustrates one example of an FDD frame structure which is applicable when a nominal channel bandwidth is any one of 5 MHz, 10 MHz, and 20 MHz, and G=1/8. The relay station of an FDD system uses DL carriers in a DL relay zone to receive a signal from a base station, and uses UL carriers in a UL relay zone to transmit a signal to the base station.

Referring to FIG. 4, an idle state time interval (R_Idle-Time) may be inserted between relay-station radio frames. The length of the R_IdleTime may be transmitted to mobile stations from the relay station through an AAI_System Configuration Descriptor message. In a relay-station DL frame the length of the R_IdleTIme is equal to an idle time (Idle-Time) of the base station. In a relay-station UL frame, the length of the R_IdleTIme is equal to or smaller than the IdleTime of the base station. The relay station UL frame may come before a base-station UL frame in time by Tadv. The Tadv may be calculated by Tadv=IdleTime-R_IdleTime.

When the relay station changes the status of a transceiver from transmission to reception or from reception to transmission, a transition gap may be inserted. Referring to FIG. 4, in a relay-station DL frame, an R-TTI is inserted between the access zone and the relay zone, and an R-RTI is inserted between the relay zone and an access zone of the next relay-station DL frame. The position of the R-TTI may be the last OFDMA symbol of the last subframe of the access zone, and the R-RTI may be inserted in the position of the last OFDMA symbol of the last subframe of the relay zone. The length of the R-TTI is zero when RTD/2>ARSTTG, and may be determined to be Ts when RTD/2<ARSTTG. In this case, the RTD denotes a round trip delay between the relay station and a superordinate station. The length of the R-RTI is zero when IdleTime-RTD/2≥ARSRTG, and is determined to be Ts when IdleTime-RTD/2<ARSRTG.

An SF3 in which the R-TTI is inserted includes five OFDMA symbols, and the operation of a mobile station may be affected accordingly. If the R-TTI is not inserted, a subframe within the DL access zone of the relay station is identical to a subframe within the DL access zone of the base station.

Furthermore, in the relay-station UL frame, an R-RTI is inserted between an access zone and a relay zone, and an R-TTI is inserted between the relay zone and an access zone of the next relay station DL frame. The position of the R-RTI may be the first OFDMA symbol of the first subframe of the relay zone, and the R-TTI may be inserted in the position of the last OFDMA symbol of the last subframe of the relay zone.

Figure 5:
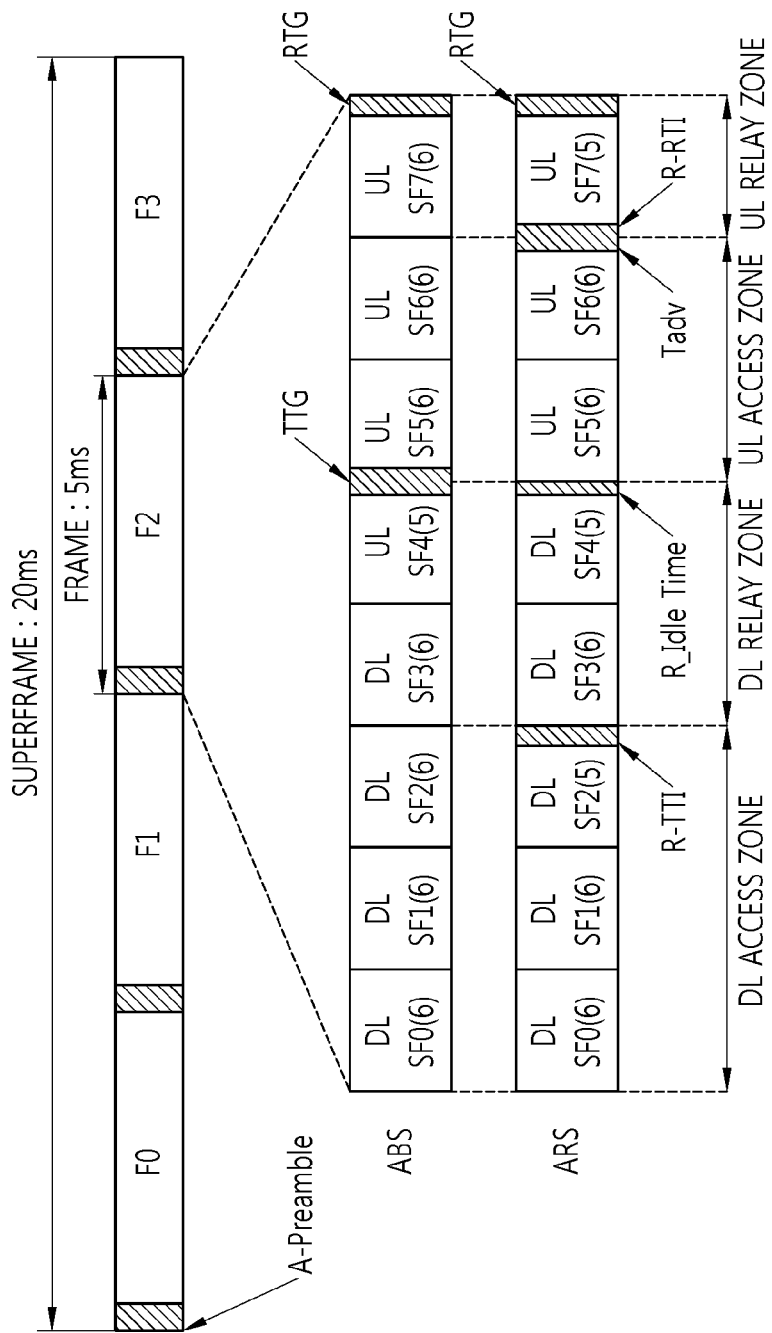
FIG. 5 illustrates one example of a TDD frame structure of a system supporting a relay station.

FIG. 5 illustrates one example of a TDD frame structure of a system supporting a relay station.

FIG. 5 illustrates one example of an TDD frame structure applicable when a nominal channel bandwidth is any one of 5 MHz, 10 MHz and 20 MHz, and G=1/8. A ratio of a DL frame to a UL frame is 5:3.

Referring to FIG. 5, an R_IdleTime is inserted before a switching point at which switching from a DL sector to a UL sector takes place. The length of the R_IdleTime may be transmitted to mobile stations from a relay station through an AAI_System Configuration Descriptor message. A relay-station UL frame may precede a base-station UL frame in time by Tadv. The length of the R_IdleTIme is equal to or smaller than TTG. Furthermore, in each relay-station radio frame, an RTG is inserted before a switching point at which switching from a UL sector to a DL sector takes place.

Furthermore, referring to FIG. 5, the relay-station frame of a FDD system has an R-TTI between an access zone and a relay zone in the DL sector. A subframe SF2 in the DL access zone in which the R-TTI is inserted includes five OFDMA symbols. Accordingly, the operation of a mobile station can be affected. If the R-TTI is not inserted, the subframe of the DL access zone of the relay station is identical to a subframe within a DL access zone of a base station. Furthermore, the relay-station frame of the TDD system has an R-RTI between the access zone and the relay zone in the UL sector.

Figure 6:
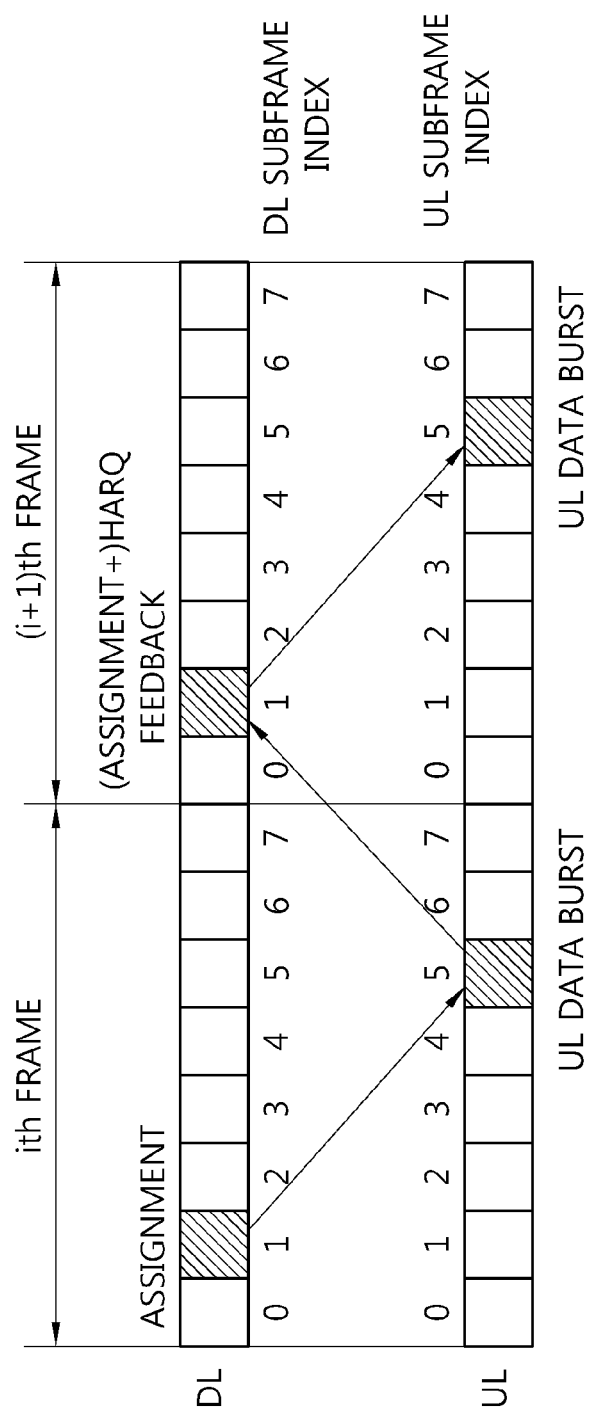
FIG. 6 illustrates one example of a UL Hybrid Automatic Repeat request (HARQ) timing in an FDD system.

FIG. 6 illustrates one example of a UL Hybrid Automatic Repeat request (HARQ) timing in an FDD system.

The UL HARQ timing of FIG. 6 is applicable when a channel bandwidth is any one of 5 MHz, 10 MHz and 20 MHz. Referring to FIG. 6, in the second subframe (index 1) of the $i^{th}$ frame, a UL basic assignment A-MAP Information Element (IE) or a UL subband assignment A-MAP IE is transmitted from a base station to a mobile station. In the sixth subframe (index 5) of the $i^{th}$ frame, a data burst corresponding to the UL basic assignment A-MAP IE or the UL subband assignment A-MAP IE is transmitted from the mobile station to the base station. In the second subframe of the $(i+1)^{th}$ frame, DL HARQ feedback for the UL HARQ subpacket is transmitted from the base station to the mobile station. When the DL HARQ feedback indicates Non-acknowledgement (NACK), the retransmission of the UL HARQ subpacket is performed in the sixth subframe of the $(i+1)^{th}$ frame. In FIG. 6, it is assumed that the time it takes for the base station to process the data burst and the time it takes for the mobile station to process the data burst is equal to three subframes. However, the present invention is not limited thereto, and the time required to process the data burst may be variously set and may vary according to base and mobile stations.

Figure 7:
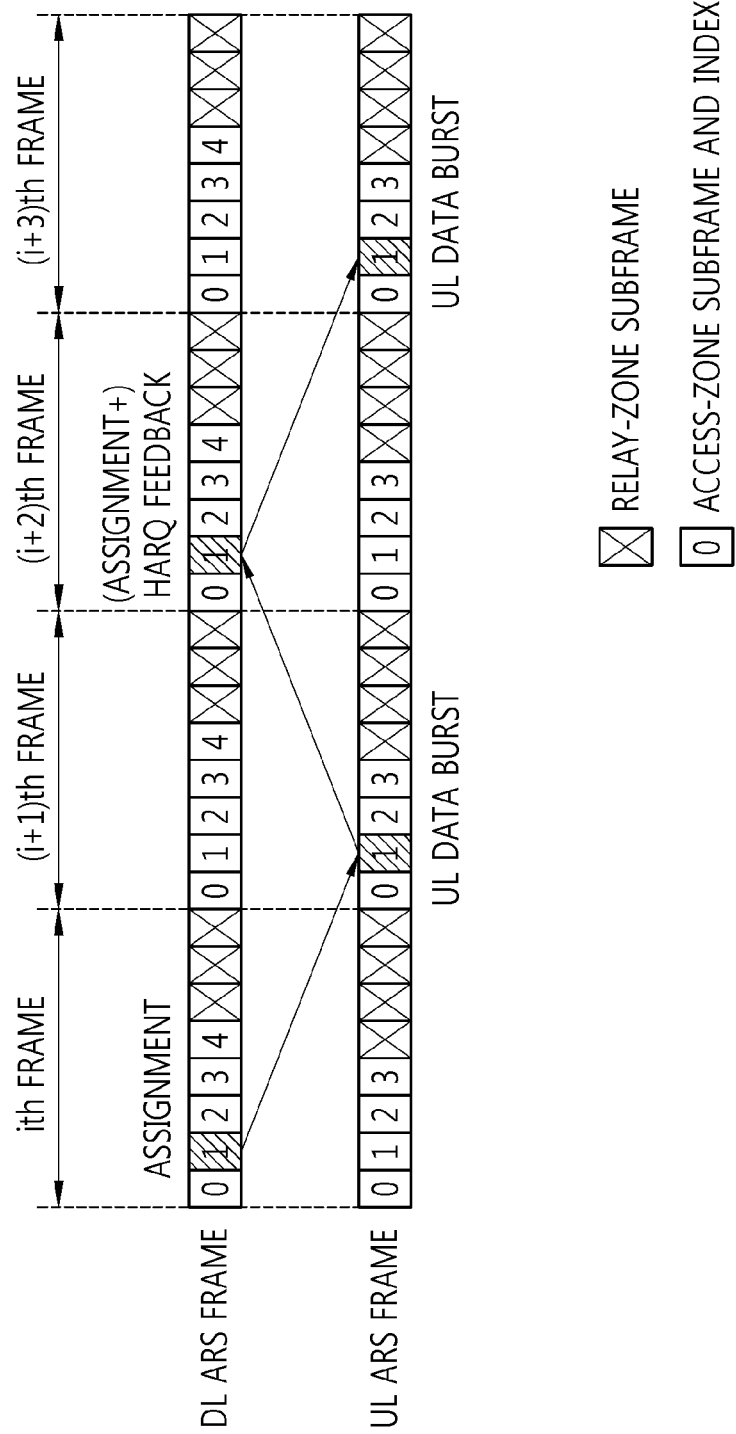
FIG. 7 illustrates one example of UL HARQ timing between a relay station and a mobile station in an FDD system adopting a relay station.

FIG. 7 illustrates one example of UL HARQ timing between a relay station and a mobile station in an FDD system adopting a relay station.

The UL HARQ timing of FIG. 7 is applicable when a channel band width is any one of 5 MHz, 10 MHz and 20 MHz. In a frame structure depicted in FIG. 7, a DL frame of a relay station has an access zone including five DL subframes, and a relay zone including three DL subframes. Furthermore, a UL frame of the relay station has an access zone including four UL subframes, and a relay zone including four UL subframes.

Referring to FIG. 7, in the second subframe (index 1) of the $i^{th}$ frame, a UL basic assignment A-MAP IE is transmitted from a relay station to a mobile station. In the second subframe (index 1) of the $(i+1)^{th}$ frame, a UL data burst corresponding to the UL basic assignment A-MAP IE, that is a UL HARQ subpacket, is transmitted from the mobile station to the relay station. Unlike FIG. 6, since the fifth to eighth UL subframes of the $i^{th}$ subframe are assigned to a relay zone, the UL data burst cannot be received from the mobile station. Accordingly, the UL data burst is received in the access zone of the $(i+1)^{th}$ subframe. In the second subframe of the $(i+2)^{th}$ frame, DL HARQ feedback for the UL HARQ subpacket is transmitted from the relay station to the mobile station. When the DL HARQ feedback commands NACK, the retransmission of the UL HARQ subpacket is performed in the second subframe of the $(i+3)^{th}$ subframe. In FIG. 6, it is assumed in FIG. 6 that the time it takes for the base station to process a data burst or the time it takes for the mobile station to process the data burst is as long as three subframes. However, the present invention is not limited thereto. The time required to process such a data burst may be variously set and vary according to the base station and the mobile station.

As described with reference to FIGS. 6 and 7, the FDD system without a relay station and the FDD system adopting a relay station are different in UL HARQ timing. In particular, in the FDD system adopting a relay station, there is a limit to a subframe by which a relay station and a mobile station can transmit/receive data according to the assignment of access and relay zones. Since the UL HARQ timing is different between the FDD systems with and without the relay station, the HARQ operation of a mobile station needs to be varied according to a system. That is, the HARQ operation of a mobile station is varied according to whether a cell type is a macro cell or a relay cell. However, the mobile station can be informed of the cell type by just a neighbor advertisement message (AAI_NBR_ADV) at the time of handover, and is unable to learn the cell type at the time of network entry. Accordingly, the mobile station cannot perform HARQ without information regarding whether the cell type is a macro cell or a relay cell.

Meanwhile, if a mobile station does not the cell type at the time of network entry, various limitations, other than HARQ operation, may be caused.

1) Long TTI: A macro cell and a relay cell are different in length of a long TTI. In the macro cell, the length of the long TTI is four in an FDD system, and is equal to the total number of DL/UL subframes in a TDD system. The length of a long TTI in a relay cell is equal to the number of DL/UL subframes of access and relay zones. Accordingly, without information regarding a cell type, the mobile station cannot receive or transmit a DL data burst at a long TTI.

2) Relay midamble (R-amble): A relay frame may transmit an R-amble in a relay zone, and at this time, the type of subframe may be changed. A reduction by one in the number of OFDMA symbols occurs in subframes within DL relay zones of base-station and relay-station frames where R-ambles are located. Accordingly, a type-1 subframe including six OFDMA symbols is changed to a type-2 subframe including five OFDMA symbols, and a type-3 subframe including seven OFDMA symbols is changed to a type-1 subframe including six OFDMA symbols. Thus, without information regarding cell type, the mobile station cannot receive subframes.

3) Transition gap: As described above, a transition gap may be inserted between an access zone and a relay zone. When the transition gap is inserted in the access zone, the type of subframe may be changed as in the case of 2) above. Accordingly, without information regarding cell type, the mobile station cannot transmit or receive subframes.

As described above, various limitations occur if the mobile station does not know about information regarding cell type at the time of network entry. If the mobile station does not have information regarding cell type when attempting network entry, a relay station needs to transparently operate. To address this, various methods are required.

First, a method for solving a UL HARQ timing issue in the FDD system with a relay station will be described. Hereinafter, a description will be made on an FDD frame structure minimizing influence upon a mobile station and signaling overhead while ensuring the HARQ operation of the mobile station even when the mobile station, attempting network entry, does not have information regarding cell type.

Figure 8:
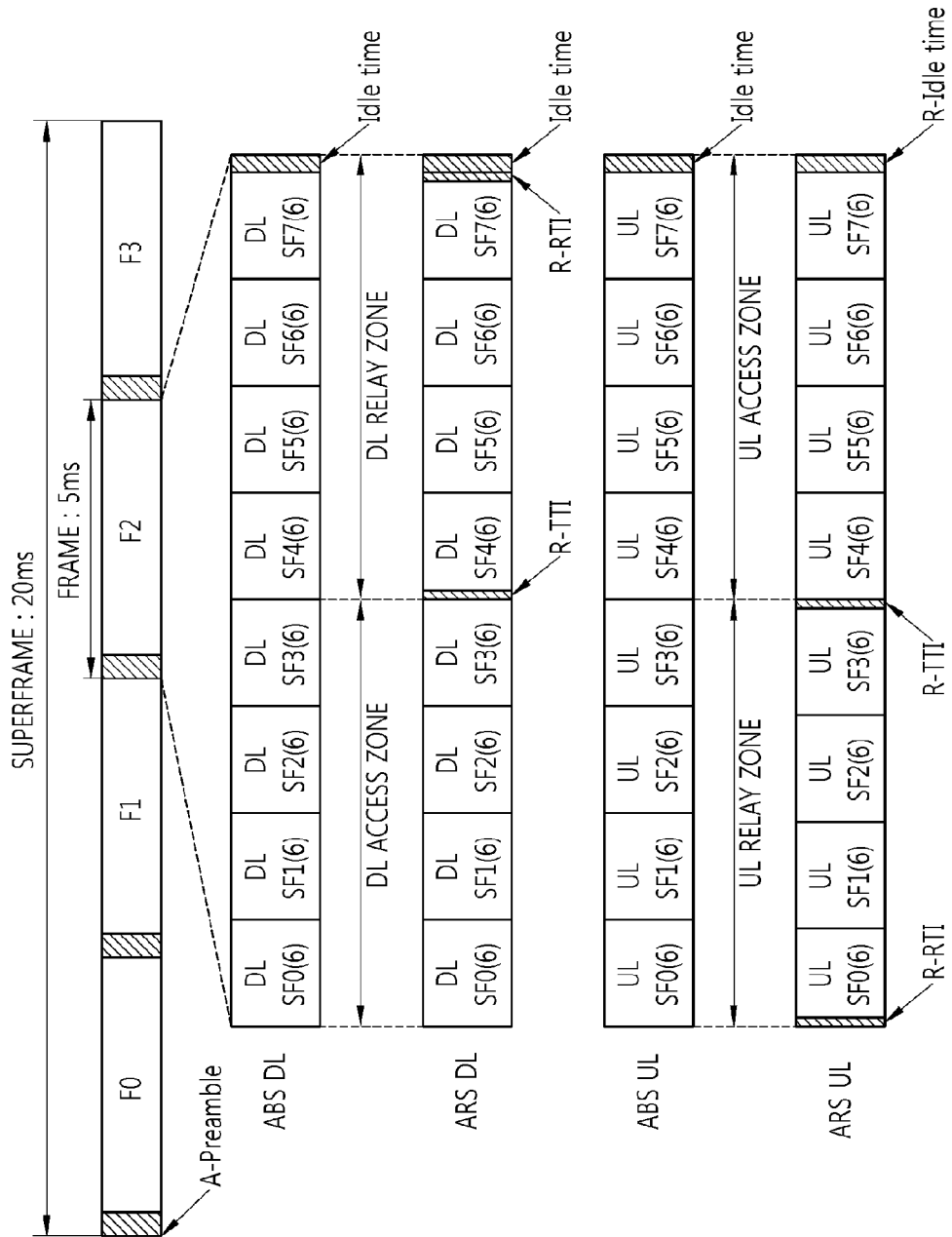
FIG. 8 illustrates one example of an FDD frame structure according to an embodiment of the present invention.

FIG. 8 illustrates one example of an FDD frame structure according to an embodiment of the present invention.

An FDD frame structure depicted in FIG. 8 and the FDD frame structure described with reference to FIG. 4 are similar, except that in FIG. 8, the position of a relay zone comes before the position of an access zone in a UL frame. Here, the positions of access and relay zones are the same in DL frames. The number of DL subframes included in the access zone of a DL frame and the number of UL subframes included in the access zone of a UL frame may be fixed to the same number. For example, when an FDD frame includes an even number of subframes, the number of DL subframes included in the access zone of the DL frame and the number of UL subframes included in the access zone of the UL frame may each be half the number of subframes forming the FDD frame. That is, in the case where the FDD frame includes eight subframes, the number of DL subframes included in the access zone of a DL frame and the number of UL subframes included in the access zone of a UL frame may each be four. Due to the switched positions of the relay zone and the access zone in the UL frame, the situation where a UL data burst cannot be transmitted by the assignment to the relay zone as described with reference to FIG. 7 does not occur, and the UL HARQ timing of the FDD system without a relay station of FIG. 6 can be used as it is.

An R-RTI or an R-TTI may be inserted in the proposed relay zone and an access zone of a previous UL frame, and the R-TTI may be inserted between a relay zone and an access zone. The position of the R-RTI may be the first OFDMA symbol of the first subframe of the relay zone, and the R-TTI may be inserted in the position of the last OFDMA symbol of the last subframe of the relay zone. The lengths of the R-RTI and the R-TTI may be determined to be the same as in the FDD frame structure depicted in FIG. 4. That is, if IdleTime-RTD/2>ARSRTG, the R-RTI is zero and, otherwise, the R-RTI is determined to be Ts. If RTD/2>ARSTTG, the R-TTI is zero, and, otherwise, the R-TTI may be determined to be Ts.

Figure 9:
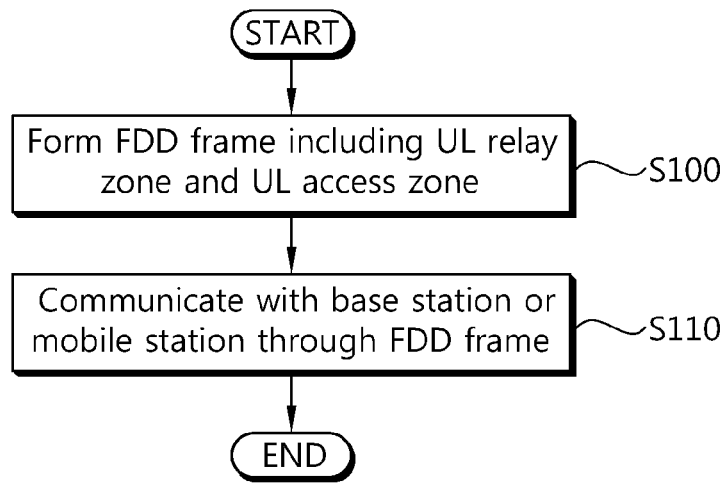
FIG. 9 illustrates one embodiment of a method of forming a proposed frame.

FIG. 9 illustrates one embodiment of a method of forming a proposed frame.

In operation S100, a base station forms an FDD UL frame including a relay zone and an access zone. In this case, the position of the relay zone may come before the position of the access zone in the FDD frame. In operation S110, the base station communicates with a relay station or a mobile station through the FDD frame.

Figure 10:
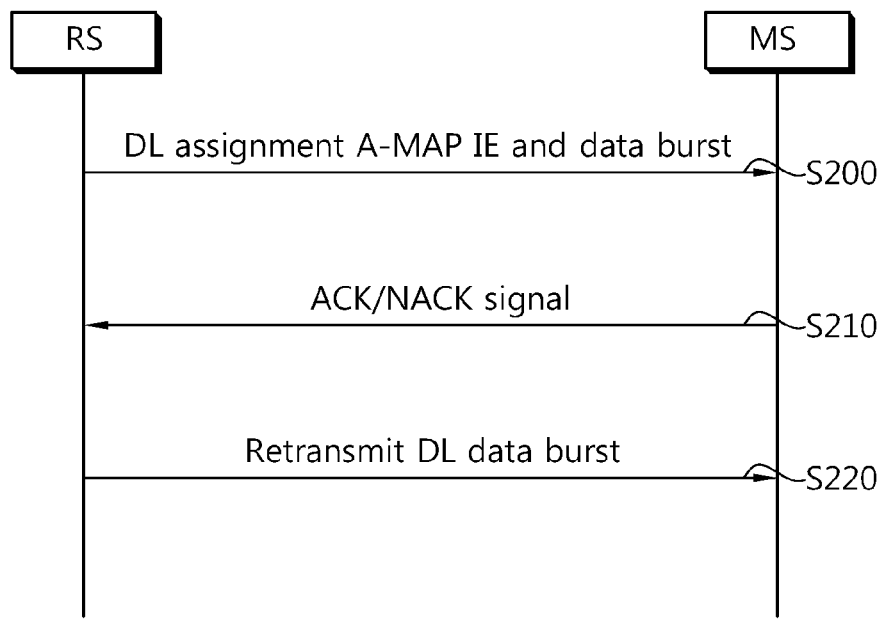
FIGS. 10 and 11 illustrate one embodiment of a method of performing HARQ between a relay station and a mobile station according to the proposed frame formation.
Figure 11:
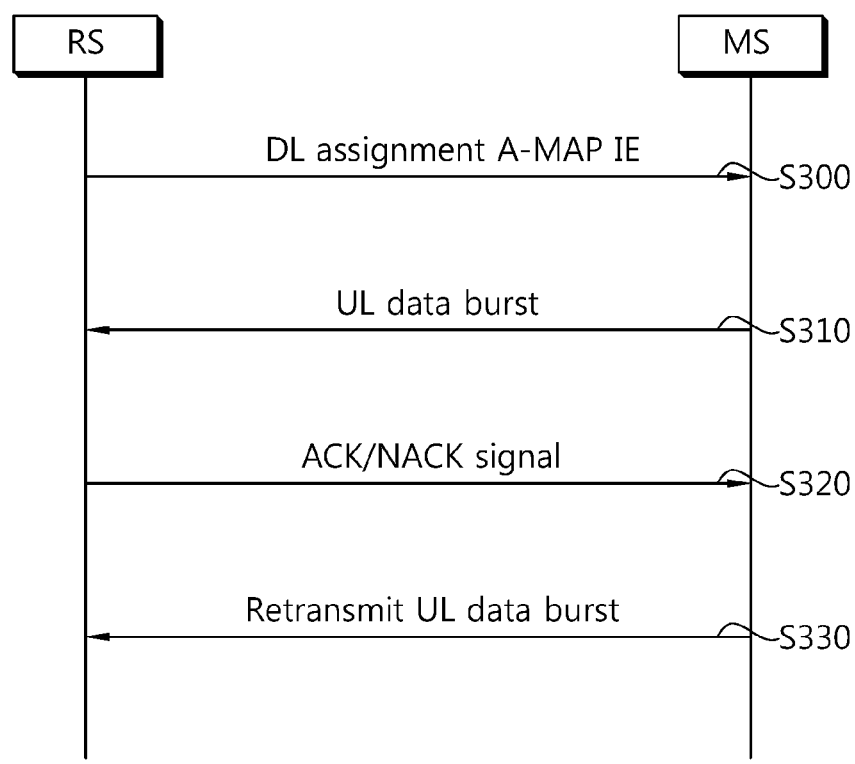

FIGS. 10 and 11 illustrate one embodiment of a method of performing HARQ between a relay station and a mobile station according to the proposed frame formation.

Referring to FIG. 10, a relay station transmits a DL assignment A-MAP IE and a DL data burst to a mobile station in operation S200. In operation S210, the mobile station transmits HARQ feedback on the DL data burst, that is, an ACK/NACK signal to the relay station. In operation S220, when the HARQ feedback indicates NACK, the relay station performs the retransmission of the DL data burst. Referring to FIG. 11, in operation S300, the relay station transmits a UL assignment A-MAP IE to the mobile station. In operation S310, the mobile station transmits a UL data burst according to the UL assignment A-MAP IE to the relay station. In operation S320, the relay station transmits HARQ feedback on the UL data burst, that is, an ACK/NACK signal, to the mobile station. In operation S330, the mobile station performs the retransmission of the UL data burst when the HARQ feedback indicates NACK.

Figure 12:
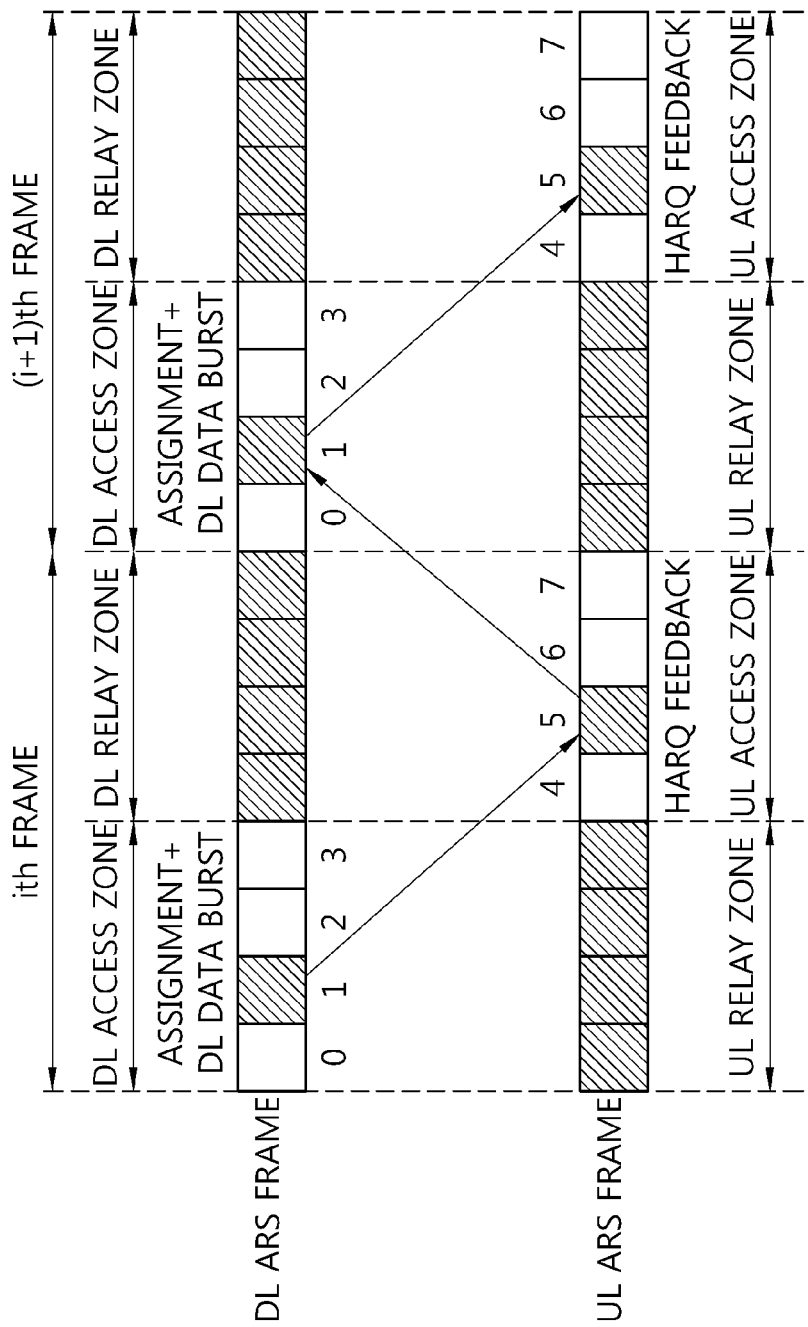
FIGS. 12 and 13 illustrate one example of HARQ timing between the relay station and the mobile station according to the proposed frame formation.
Figure 13:
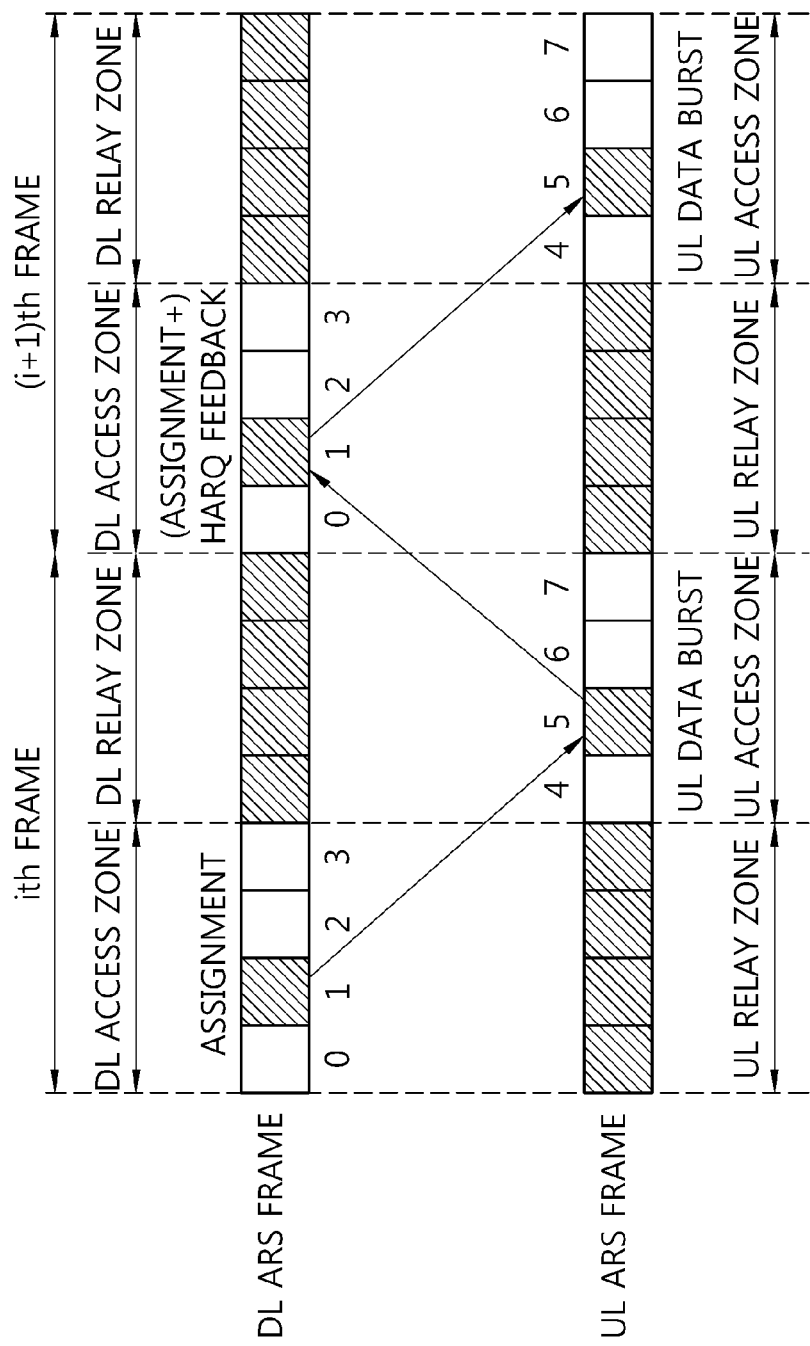

FIGS. 12 and 13 illustrate one example of HARQ timing between the relay station and the mobile station according to the proposed frame formation.

DL HARQ timing of FIG. 12 corresponds to the method of performing HARQ as shown in FIG. 10, and UL HARQ timing of FIG. 13 corresponds to the method of performing HARQ as shown in FIG. 11. Referring to FIG. 12, in the second subframe (index 1) of the $i^{th}$ frame, a DL basic assignment A-MAP IE and a DL data burst are transmitted from a relay station to a mobile station. In the sixth subframe (index 5) of the $i^{th}$ frame, UL HARQ feedback corresponding to the DL data burst is transmitted from the mobile station to the relay station. If the UL HARQ feedback indicates NACK, the retransmission of the DL data burst is performed in the second subframe of the $(i+1)^{th}$ subframe. Furthermore, referring to FIG. 13, in the second subframe (index 1) of the $i^{th}$ frame, a UL basic assignment A-MAP IE is transmitted from a relay station to a mobile station. In the sixth subframe (index 5) of the $i^{th}$ frame, a UL data burst corresponding to the UL basic assignment A-MAP IE is transmitted from the mobile station to the relay station. In the second subframe of the $(i+1)^{th}$ frame, DL HARQ feedback on the UL data burst is transmitted from the relay station to the mobile station. If the DL HARQ feedback indicates NACK, the retransmission of the UL data burst is performed in the sixth subframe of the $(i+1)^{th}$ subframe. AS described above, as the UL frame of the relay station is located before the access zone, the HARQ operation of the mobile station can be performed in the same manner as in a system without a relay station.

Meanwhile, the limitations, caused when a mobile station does have information regarding cell type at the time of network entry, can be solved by the following method.

1) Long TTI: The assignment of a long TTI may not be permitted until a mobile station learns the presence of a relay station through an AAI-SCD message or the like. The AAI-SCD message may indicate the number of subframes of an access zone or a relay zone, the transmission of an R-amble, and relay configuration such as a period.

2) R-amble: When a value of a relay-zone MS assignment indicator in an AAI-SCD message (AAI_Relay_zone_AMS_assignment_indicator) is zero, a long TTI is not assigned until a mobile station learns the presence of a relay station, and only R-amble may be transmitted. When a value of the relay zone MS assignment indicator is 1, the R-amble may not be transmitted.

3) Transition gap: Every transition gap may be assigned to a relay zone so that there is no influence on a mobile station.

Figure 14:
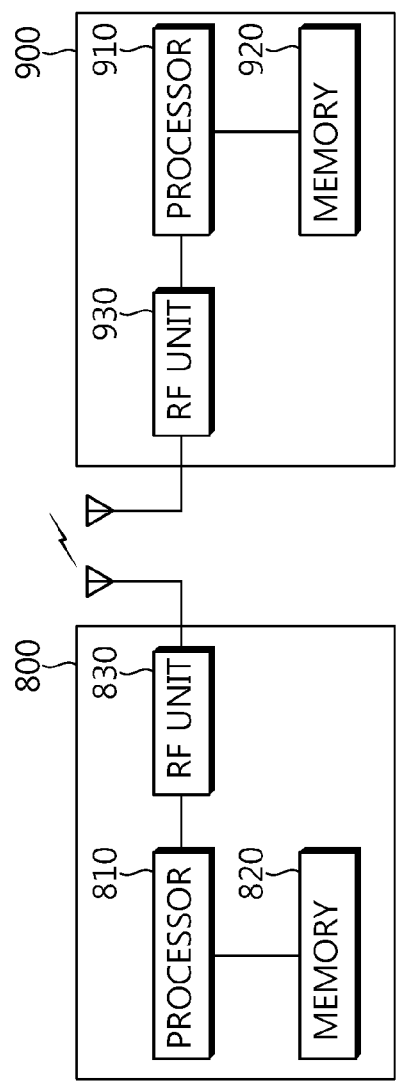
FIG. 14 is a block diagram of a base station and a mobile station where the embodiment of the present invention is implemented.

FIG. 14 is a block diagram of a base station and a mobile station where the embodiment of the present invention is implemented.

A base station 800 includes a processor 810, a memory 820, and an RF unit 830. The processor 810 implements the proposed functions, processes and/or methods. The layers of a wireless Internet protocol may be implemented by the processor 810. The processor 810 configures an FDD UL frame including a UL relay zone, including a plurality of UL subframes, and a UL access zone including a plurality of UL subframes. In the FDD UL frame, the UL relay zone is located before the UL access zone. The memory 820 is coupled to the processor 810 and stores various information for driving the processor 810. The RF unit 830 is coupled to the processor 810 and transmits or receives a radio signal.

The mobile station 900 includes a processor 910, a memory 920 and an RF unit 930. The processor 910 implements the proposed functions, processes and/or methods. The layers of a wireless Internet protocol may be implemented by the processor 910. The processor 910 is configured to receive an UL assignment A-MAP IE from the relay station through a DL access zone within a first frame, transmit a UL data burst, corresponding to the UL assignment A-MAP IE, through a UL access zone within the first frame, and receive an ACK/NACK) signal with respect to the UL data burst from the relay station through a DL access zone within a second frame contiguous to the first frame. The first frame and the second frame are FDD frames each divided into a DL frame and a UL frame in a frequency region. The UL frame comprises a UL relay zone including a plurality of UL subframes, and a UL access zone including a plurality of UL subframes. The UL relay zone is located before the UL access zone in the UL frame. The memory 920 is coupled to the processor 910 and stores various information for driving the processor 910. The RF unit 930 is coupled to the processor 910 and transmits or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

The invention claimed is:

1. A method of communicating by a relay station a wireless communication system including a relay station, the method comprising:
    communicating with at least one of a base station and a user equipment through a frequency division duplex (FDD) frame, which includes a FDD downlink (DL) frame and a FDD UL frame, configured by the base station,
    wherein the FDD DL frame includes a DL relay zone including a plurality of DL subframes, which is used to receive from the base station, and a DL access zone including a plurality of DL subframes, which is used to transmit to the user equipment,
    wherein the FDD UL frame includes a UL relay zone including a plurality of UL subframes, which is used to transmit to the base station, and a UL access zone including a plurality of UL subframes, which is used to receive from the user equipment,
    wherein a position of the DL access zone precedes a position of the DL relay zone within the FDD DL frame,
    wherein a position of the UL relay zone precedes a position of the UL access zone within the FDD UL frame, and
    wherein if a relay receive to transmit transition interval (R-RTI) is inserted, the R-RTI being an interval during which the relay station transitions from a reception mode to a transmission mode, the R-RTI is inserted in a last orthogonal frequency division multiple access (OFDMA) symbol of a last DL subframe included in the DL relay zone and a first OFDMA symbol of a first UL subframe included in the UL relay zone.

2. The method of claim 1, wherein the plurality of UL subframes included in the UL access zone are four in number if a number of subframes included in the FDD UL frame is eight.

3. The method of claim 1, wherein the plurality of DL subframes included in the DL access zone are four in number if a number of subframes included in the FDD DL frame is eight.

4. The method of claim 1, wherein a Relay Transmit to receive Transition Interval (R-TTI), which is a transition gap for which a transmission mode of the relay station changes to a reception mode, is inserted in the UL relay zone.

5. The method of claim 4, wherein the R-TTI is inserted in position of a last OFDMA symbol of a last UL subframe of the plurality of UL subframes included in the UL relay zone.

6. A method of performing a Hybrid Automatic Repeat request (HARQ) by a mobile station in a wireless communication system including a relay station, the method comprising:
    receiving an Uplink (UL) assignment A-MAP Information Element (IE) from the relay station through a first downlink (DL) access zone within a first frequency division duplex (FDD) downlink (DL) frame, wherein the first FDD DL frame includes the first DL access zone including a plurality of DL subframes, which is used to receive the UL assignment A-MAP IE from the relay station, and a first DL relay zone including a plurality of DL subframes, and wherein a position of the first DL access zone precedes a position of the first DL relay zone within the first FDD DL frame;
    transmitting a UL data burst, corresponding to the UL assignment A-MAP IE, to the relay station through a first UL access zone within a first FDD UL frame, wherein the first FDD UL frame includes the first UL access zone including a plurality of UL subframes, which is used to transmit the UL data burst to the relay station, and a first UL relay zone including a plurality of UL subframes, wherein a position of the first UL relay zone precedes a position of the first UL access zone within the first FDD UL frame, and wherein the first FDD DL frame and the first FDD UL frame constitute a first frame; and
    receiving an Acknowledgement (ACK)/Non-acknowledgement (NACK) signal with respect to the UL data burst, from the relay station through a second DL access zone within a second FDD DL frame contiguous to the first FDD DL frame, wherein the second FDD DL frame includes the second DL access zone including a plurality of DL subframes, which is used to receive the ACK/NACK signal from the relay station, and a second DL relay zone including a plurality of DL subframes, and wherein a position of the second DL access zone precedes a position of the second DL relay zone within the second FDD DL frame,
    wherein a second FDD UL frame includes a second UL access zone including a plurality of UL subframes and a second UL relay zone including a plurality of UL subframes, wherein a position of the second UL relay zone precedes a position of the second UL access zone within the second FDD UL frame, and wherein the second FDD DL frame and the second FDD UL frame constitute a second frame, and
    wherein if a relay receive to transmit transition interval (R-RTI) is inserted, the R-RTI being an interval during which the relay station transitions from a reception mode to a transmission mode, the R-RTI is inserted in a last orthogonal frequency division multiple access (OFDMA) symbol of a last DL subframe included in the DL relay zone and a first OFDMA symbol of a first UL subframe included in the UL relay zone.

7. The method of claim 6, wherein the plurality of UL subframes included in the first UL access zone or the second UL access zone are four in number if a number of subframes included in the first FDD UL frame or the second FDD UL frame is eight.

8. The method of claim 6, wherein the plurality of DL subframes included in the first DL access zone or the second DL access zone are four in number if a number of subframes included in the first FDD DL frame or the second FDD DL frame is eight.

9. The method of claim 6, wherein a Relay Transmit to receive Transition Interval (R-TTI), which is a transition gap for which a transmission mode of the relay station changes to a reception mode, is inserted in the first UL relay zone and the second UL relay zone.

10. A user equipment in a wireless communication system including a relay station, the user equipment comprising:
    a radio frequency (RF) unit configured to transmit or receive a radio signal, and
    a processor, coupled to the RF unit, and configure to:
    receive an Uplink (UL) assignment A-MAP Information Element (IE) from the relay station through a first Downlink (DL) access zone within a first frequency division duplex (FDD) downlink (DL) frame, wherein the first FDD DL frame includes the first DL access zone including a plurality of DL subframes, which is used to receive the UL assignment A-MAP IE from the relay station, and a first DL relay zone including a plurality of DL subframes, and wherein a position of the first DL access zone precedes a position of the first DL relay zone within the first FDD DL frame, transmit a UL data burst, corresponding to the UL assignment A-MAP IE, to the relay station through a first UL access zone within a first FDD UL frame, wherein the first FDD UL frame includes the first UL access zone including a plurality of UL subframes, which is used to transmit the UL data burst to the relay station, and a first UL relay zone including a plurality of UL subframes, wherein a position of the first UL relay zone precedes a position of the first UL access zone within the first FDD UL frame, and wherein the first FDD DL frame and the first FDD UL frame constitute a first frame, and receive an Acknowledgement (ACK)/Non-acknowledgement (NACK) signal with respect to the UL data burst from the relay station through a second DL access zone within a second FDD DL frame contiguous to the first FDD DL frame, wherein the second FDD DL frame includes the second DL access zone including a plurality of DL subframes, which is used to receive the ACK/NACK signal from the relay station, and a second DL relay zone including a plurality of DL subframes, and wherein a position of the second DL access zone precedes a position of the second DL relay zone within the second FDD DL frame, wherein a second FDD UL frame includes a second UL access zone including a plurality of UL subframes and a second UL relay zone including a plurality of UL subframes, wherein a position of the second UL relay zone precedes a position of the second UL access zone within the second FDD UL frame, and wherein the second FDD DL frame and the second FDD UL frame constitute a second frame, and wherein if a relay receive to transmit transition interval (R-RTI) is inserted, the R-RTI being an interval during which the relay station transitions from a reception mode to a transmission mode, the R-RTI is inserted in a last orthogonal frequency division multiple access (OFDMA) symbol of a last DL subframe included in the DL relay zone and a first OFDMA symbol of a first UL subframe included in the UL relay zone.

\* \* \* \* \*